US012785290B2

(12) United States Patent
Wyler

(10) Patent No.: US 12,785,290 B2
(45) Date of Patent: Nov. 3, 2026

(54) STRUCTURAL ELEMENT HAVING THIN FILM SOLAR CELLS AND THIN FILM ANTENNA ELEMENTS

(71) Applicant: WILDSTAR, LLC, Saratoga, CA (US)

(72) Inventor: Gregory Thane Wyler, Stuart, FL (US)

(73) Assignee: WildStar LLC, Arlington, TX (US)

( * ) Notice: Subject to any disclaimer, the term of this patent is extended or adjusted under 35 U.S.C. 154(b) by 225 days.

(21) Appl. No.: 18/715,030

(22) PCT Filed: Dec. 23, 2022

(86) PCT No.: PCT/US2022/054005
§ 371 (c)(1),
(2) Date: May 30, 2024

(87) PCT Pub. No.: WO2023/122350
PCT Pub. Date: Jun. 29, 2023

(65) Prior Publication Data

US 2025/0038425 A1 Jan. 30, 2025

Related U.S. Application Data

(60) Provisional application No. 63/293,616, filed on Dec. 23, 2021.

(51) Int. Cl.

| | |
|---|---|
| ***H01Q 21/06*** | (2006.01) |
| ***B64G 1/22*** | (2006.01) |
| ***B64G 1/44*** | (2006.01) |
| ***H01Q 1/28*** | (2006.01) |
| ***H01Q 1/38*** | (2006.01) |

(52) U.S. Cl.
CPC ......... *H01Q 21/061* (2013.01); *B64G 1/2227* (2023.08); *B64G 1/443* (2013.01); *H01Q 1/288* (2013.01); *H01Q 1/38* (2013.01); *B64G 1/2225* (2023.08)

(58) Field of Classification Search
USPC .......................................................... 343/708
See application file for complete search history.

(56) References Cited

U.S. PATENT DOCUMENTS

| | | | | |
|---|---|---|---|---|
| 6,647,668 | B1 * | 11/2003 | Cohee | B64G 1/2227 52/63 |
| 2005/0178426 | A1 | 8/2005 | Simburger et al. | |
| 2012/0287018 | A1 | 11/2012 | Parsche | |
| 2017/0021947 | A1 * | 1/2017 | Pellegrino | B64G 1/443 |

(Continued)

FOREIGN PATENT DOCUMENTS

| | | | |
|---|---|---|---|
| EP | 1025617 | B1 | 1/2006 |
| WO | 2021042076 | A1 | 3/2021 |

OTHER PUBLICATIONS

International Application No. PCT/US2022/054005, International Search Report and Written Opinion mailed Jun. 21, 2023, 20 pages.

*Primary Examiner* — Alexander H Taningco
*Assistant Examiner* — Brandon Sean Woods
(74) *Attorney, Agent, or Firm* — Erin P. Madill

(57) ABSTRACT

A structural element, such as for use in conjunction with a satellite, may include one or more thin film solar cells (108-*i*), which are supported on a substrate (102), and a plurality of thin film antenna elements (110-*i*), which are supported on a carrier layer (104). The substrate (102) functions as a ground plane for the antenna elements (110-*i*).

33 Claims, 5 Drawing Sheets

(56) References Cited

U.S. PATENT DOCUMENTS

| | | | | |
|---|---|---|---|---|
| 2018/0281303 | A1 | 10/2018 | Yerazunis et al. | |
| 2020/0365966 | A1 | 11/2020 | Honour et al. | |
| 2022/0329271 | A1 * | 10/2022 | Mantrawadi ........... | H01Q 21/00 |

* cited by examiner

STRUCTURAL ELEMENT HAVING THIN FILM SOLAR CELLS AND THIN FILM ANTENNA ELEMENTS

STATEMENT OF RELATED CASES

This application is a national stage application, filed under 35 U.S.C. § 371, of International Patent Application No. PCT/US2022/054005, filed on Dec. 23, 2022, which is incorporated by reference herein in its entirety. International Patent Application No. PCT/US2022/054005 claims priority from U.S. provisional patent application Ser. No. 63/293,616, filed Dec. 23, 2021, and which is incorporated by reference herein in its entirety.

FIELD OF THE INVENTION

The disclosed embodiments relate to structural elements that can be used in conjunction with spacecraft such as satellites.

BACKGROUND OF THE INVENTION

Many satellites are expensive to launch and lift into orbit. This is due, in part, to the fact that many satellites have complex structures and/or are made from heavy materials that are relatively expensive in terms of their cost-to-deploy. It would be desirable to provide structural elements for a satellite that can help resolve one or more of these issues.

SUMMARY

In accordance with some of the embodiments disclosed herein, an apparatus is provided that includes a structural element having a first side including one or more thin film antennas, and a second side, opposite the first side. The first side may be spaced apart from the second side by one or members. The first side may include a plurality of the thin film antennas configured to operate together as a phased antenna array, and the second side may include one or more thin film solar panels and/or one or more thin film batteries. Each thin film solar panel may include a plurality of thin film solar cells. In some embodiments, the thin film antenna(s) can include an electrode that functions as an antenna element. The electrode can be printed on a carrier layer. The second side can include a support substrate that is configured to support the thin film solar panel or could act only as a ground plane for the electrodes. The support substrate is separated from, or separable from, the electrode by a specific separation distance and serves as a ground plane for the antenna element. Because the first side and the second side are flexible, the structural element can be folded or rolled prior to deployment in some embodiments. In one non-limiting embodiment, support members can be implemented as inflatable elements for deploying the structural element upon inflation. That said, other types of supporting members may be included. For instance, in one nonlimiting embodiment, the support members (or other elements) can be made of a shape memory alloy (SMA) material, such as a nitinol wire or other equivalent extendable structure, that can extend from a compact configuration to deploy the structural element and keep the two sides of the structural element, and hence the two thin films, separated at an appropriate separation distance for the antennas to optimally function at their desired frequency. The SMA can be a material having a reactive characteristic that enables it to have a contracted configuration that it is "forced" into while on the ground, and another expanded configuration that it expands into when in space. In some embodiments, the support members can carry an electrical current to stimulate the SMA material.

In another embodiment, an apparatus is provided that includes a structural element having a first side and a second side opposite the first side. In some embodiments, the apparatus is a spacecraft, such as a satellite, and includes one or more structural elements as wing(s) of that spacecraft. In some embodiments, the structural element(s) can be in a folded or rolled configuration prior to deployment (e.g., of the satellite, etc.), and can then be unfolded or unrolled during deployment (e.g., of the satellite, etc.) to deploy the structural element(s).

In the illustrative embodiment, the first side includes a thin film antenna having a carrier layer and a plurality of electrodes of a plurality of antenna elements disposed on the carrier layer. In some embodiments, the electrodes and the carrier layer may be implemented as a flexible thin film structures. For instance, the flexible thin film structure can include a thin film of an electrically conductive material printed on the carrier layer, which is also a thin film.

In the illustrative embodiment, the second side includes one or more solar panels, and a support substrate that is configured to support the solar panel. The support substrate is separable from the electrode on the carrier layer by a specific separation distance, so that in embodiments in which the support layer is electrically conductive or otherwise rendered so, the support layer additionally functions as a ground plane of the antenna when it is deployed. During operation of the antenna, the support substrate is separated from the electrode by the specific separation distance so that the antenna operates at as desired.

The support substrate can be any type of suitable backing material that supports the solar panel. If intended to serve as a ground plane, the support substrate must be electrically conductive, or have a second layer of an electrically conductive material attached to it. In the latter case, the solar panel(s) are disposed on one side of the support substrate and layer of electrically conductive material is attached or otherwise adhered to its other side.

In some embodiments, prior to use, the electrodes on the carrier layer and the support substrate (and hence the ground plane) can be in close proximity or direct contact. When the structural element is in use, the support substrate and the carrier layer separate from one another to achieve and maintain a specific separation distance between the antenna elements on the carrier layer and the substrate layer functioning as the ground plane. In some other embodiments, the support substrate and the carrier layer are separated prior to deployment and use of the structural element. In both cases, maintaining a proper separation distance will achieve desired antenna performance.

In some embodiments, the structural element includes one or more other elements. For example, in some of such embodiments, the structural element includes one or more inflatable elements for deploying the structural element. Upon inflation, the inflatable elements cause the support substrate and the carrier layer to move apart from one another, such as to the specific separation distance. In some of such embodiments, in addition to the inflatable elements, the structural element includes one or more "cross members" disposed along a surface of the structural element. In some of such embodiments, the cross members and/or inflatable elements can be implemented with a curable material, disposed on the support substrate and/or the carrier layer, which hardens upon being exposed to ultraviolet radiation. This increases the rigidity of the structural element.

In another embodiment, an apparatus is provided that includes one or more structural elements that may be in a folded or rolled configuration prior to deployment. Each structural element can include a first side that includes a thin film antenna, a second side opposite the first side, that includes a thin film solar panel, and possibly one or more inflatable elements. The thin film antenna and the thin film solar panel are flexible. The inflatable elements can be used to deploy the structural element upon inflation.

The structural element(s) described above can be implemented as part of a satellite, or other spacecraft, incorporating one or more of the structural elements, for example, as a wing of the satellite. The thin films that are used to carry the antenna(s) and solar panel(s) can provide an ultralight-weight solution. Additionally, because the structural elements are made of flexible material, the structural elements can be folded or rolled prior to deployment. Use of light-weight thin film materials results in a small volume, light weight and compact package. This saves significant cost when deploying any apparatus that includes these structural elements. For example, a satellite incorporating one or more of the structural elements can have very low mass, and a relatively high surface-area to volume ratio. This reduces the cost of components, the cost of assembly and manufacturing, and the cost of launching a satellite that includes the structural elements. These features can allow for a simplified and cost-effective deployment of a satellite that includes the structural elements described above.

In some further embodiments, an apparatus in accordance with the present teachings provides a first inflatable satellite, comprising: at least one wing, wherein the wing is structured to be at least partially inflatable, the wing including inflatable portions, and uninflatable portions, the inflatable and uninflatable portions collective defining a first plurality of payload-receiving regions on at least a first external surface of the one wing; a first plurality of antenna elements, the first plurality of antenna elements collectively functioning as a phased-array antenna, wherein the first plurality of antenna elements is received by at least some of the first plurality of payload-receiving regions, and wherein a spacing between the payload-receiving regions of the first plurality thereof defines an operating characteristic of the phased-array antenna; and a processor, the processor for managing operation of the phased array antenna.

In some further embodiments, the first inflatable satellite further comprises solar panels, wherein the solar panels are disposed on a second external surface of the one wing.

In some further embodiments, for the first inflatable satellite having the solar panels, the inflatable and uninflatable portions collectively define a second plurality of payload-receiving regions on the second external surface of the one wing, wherein the solar panels are received by the second plurality of payload-receiving regions.

In some further embodiments, for the first inflatable satellite having the solar panels, the processor manages operation of the solar panels.

In some further embodiments, the first inflatable satellite comprises: a second wing, a first external surface of the second wing comprising a second plurality of payload-receiving regions defined by inflatable and uninflatable portions of the second wing; and a second plurality of antenna elements, the second plurality of antenna elements collectively functioning with the first plurality of antenna elements as a phased-array antenna, wherein the second plurality of antenna elements is received by at least some of the second plurality of payload-receiving regions.

In some further embodiments, the first inflatable satellite comprises a battery.

In some further embodiments, the first inflatable satellite comprises an inflator for inflating the inflatable portions of the at least one wing.

In some further embodiments, the at least one wing of the first inflatable satellite comprises bi-axially oriented polyester film that is at least partially metallized.

In some further embodiments, the first inflatable satellite comprises plural attitude control systems.

In some further embodiments, for the first inflatable satellite comprising plural attitude control systems, a first portion of the at least one wing has a relatively lower albedo and a second portion of the at least one wing has a relatively higher albedo.

In some further embodiments, the at least one wing of the first inflatable satellite comprises plural layers of material, at least one of which layers of material harden upon inflation of the inflatable portions.

In some further embodiments, an apparatus in accordance with the present teachings provides a second inflatable satellite, comprising: a first wing and a second wing, wherein: (a) each of the first and second wings are at least partially inflatable, including inflatable and uninflatable portions, and (b) a first external surface of each of the first and second wings may include a plurality of payload-receiving regions defined, collectively, by the inflatable and uninflatable portions; a plurality of antenna elements, the plurality of antenna elements collectively functioning as a phased-array antenna, wherein the first plurality of antenna elements is received by at least some of the plurality of payload-receiving regions, and wherein a spacing between the payload-receiving regions defines an operating characteristic of the phased-array antenna; and an inflator for inflating the inflatable portions of the first wing and the second wing.

In some further embodiments, the second inflatable satellite comprises an attitude control system.

In some further embodiments, the second inflatable satellite comprises solar panels, wherein the solar panels are disposed on a second external surface of each of the first and second wings.

In some further embodiments, for second inflatable satellite comprising the solar panels, the first and second wings comprises a material having metallized portions.

DETAILED DESCRIPTION

Figure 1A:
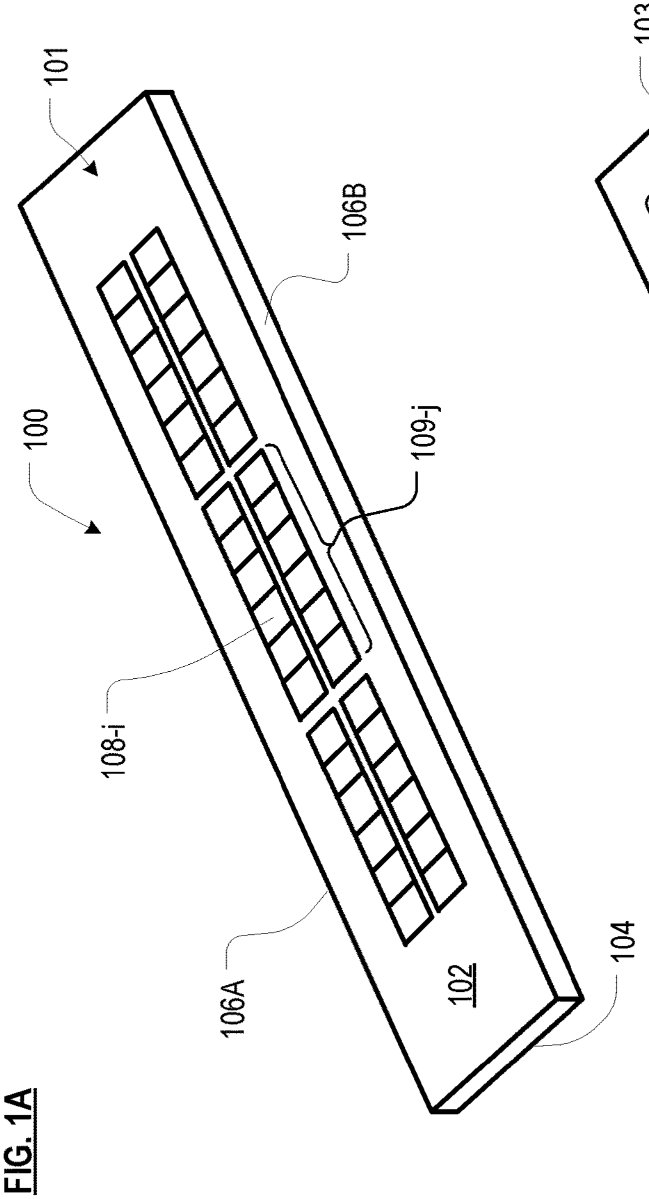
FIG. 1A illustrates a first surface of a structural element in accordance with the illustrative embodiment, the first surface supporting a plurality of thin film solar cells.
Figure 1B:
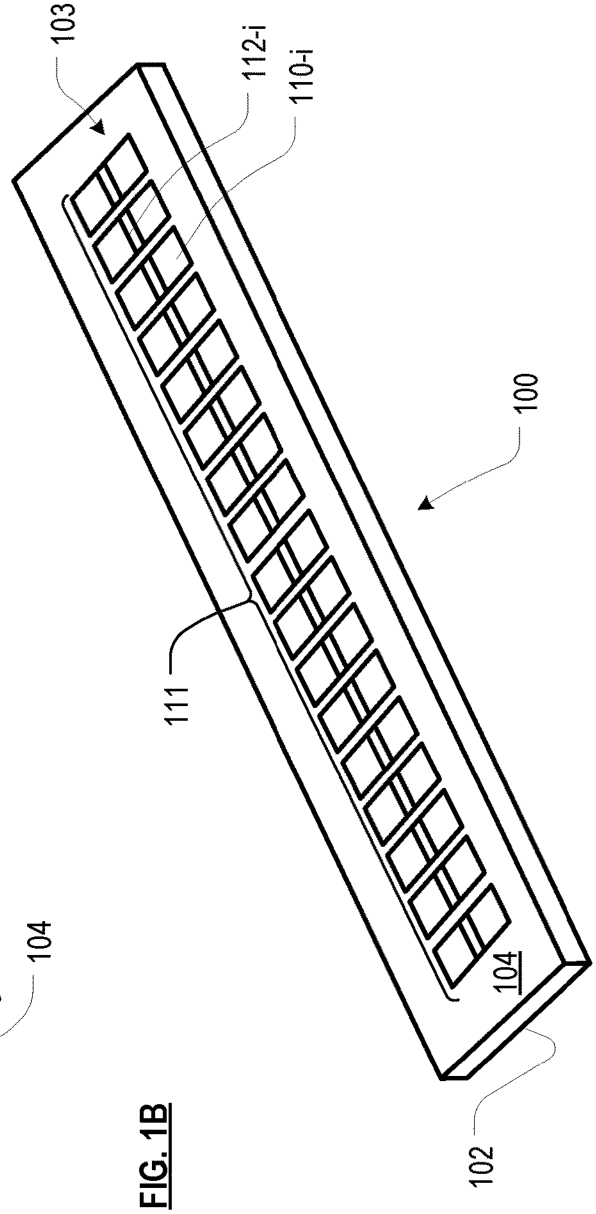
FIG. 1B illustrates a second surface of the structural element of FIG. 1A, the second surface supporting a plurality of thin film antenna elements.

FIGS. 1A and 1B illustrate, via a perspective view, the salient elements of an embodiment of structural element 100 in accordance with the present teachings. Structural element 100 can include two different sides that are illustrated in FIG. 1A as first side 101 and a second side 103 that is opposite the first side 101. As used herein, a "side" can refer to a structure or substructure. As an example, a side can be thin film of material having one or more other elements formed thereon. A side may also refer to a structure that includes multiple layers.

In some non-limiting embodiments, the structural element 100 can also include supports 106A and 106B that are configured to support the substrate 102 and carrier layer 104. In some embodiments, structural element 100 can be implemented as part of a spacecraft, such as a wing of a satellite. Structural element 100 can reduce the cost of components and assembly, while also reducing the cost to launch a satellite incorporating one or more of these structural elements 100.

As illustrated in FIG. 1A, the first side 101 includes plural solar cells 108-*i*, which collectively define one or more solar panels 109-*j*, and a support substrate 102. In the illustrative embodiment, each of solar panels 109-*i* is supported on support substrate 102, and can include any number of solar cells 108-*i*. The solar panels may be flexible thin film solar panels. Thin film solar panels are known in the art and are generally described, for example, at the following URL: https://science.howstuffworks.com/environmental/green-science/thin film-solar-cell.htm. The particular thin film solar panels that are utilized may vary depending on the implementation as there are numerous examples of thin film solar panels which can be utilized in conjunction with the embodiments described herein.

Support substrate 102 can be any type of suitable backing material that supports the solar panels. Depending on the implementation, support substrate 102 can be made of, or can include, an ultra-thin, ultralightweight, and foldable substrate material, such as any of a variety of plastics (e.g., polyethylene, polypropylene, acrylonitrile-butadiene-styrene, etc.). In an illustrative embodiment, support substrate 102 is Mylar® brand stretched polyethylene terephthalate (PTE) film, available from Dupont Teijin Films US and others. Support substrate 102 has a thickness that is typically, but not necessarily, between about 1 and 250 microns.

Figure 2:
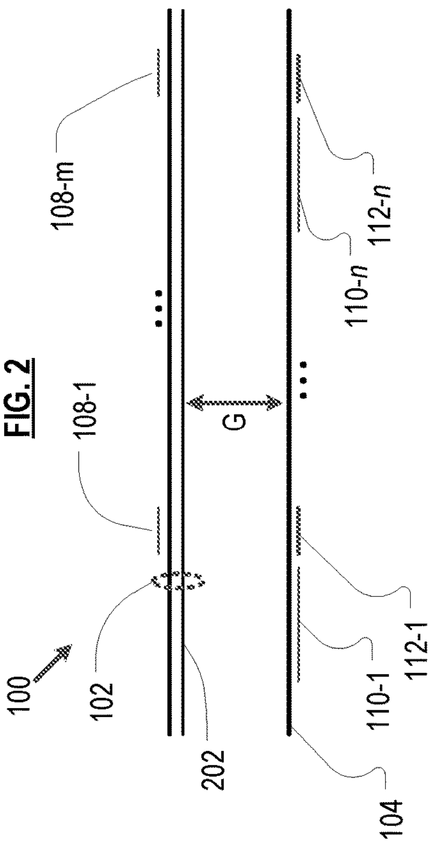
FIG. 2 illustrates a sectional view of the structural element of FIGS. 1A and 1B.

In addition to supporting solar panels 109-*i*, in some embodiments, support substrate 102 functions as a ground plane for antenna elements 110-*i*. While FIG. 2 illustrates an embodiment in which the solar panels are disposed on one side of supporting layer 202, in other embodiments, the solar panels can be disposed on the other side of supporting layer 202. Location depends of desired antenna performance and the use of the supporting layer 202 as a protective barrier for the solar panels from UV radiation. Support substrate 102, when acting as the ground plane for the antenna elements 110-*i* will be electrically conductive. This separation may be accomplished in variety of ways.

For example, in some embodiments, support substrate 102 is itself made of an electrically conductive material; alternatively, in some other embodiments, an otherwise non-electrically conductive support substrate 102 can be rendered electrically conductive via additives (i.e., electrically conductive dopants, etc.) to its formulation. In some embodiments, support substrate 102 can be made from DuraLar™ brand metallized film from Grafix Plastics of Maple Heights, Ohio. And in yet some further embodiments, as described later in conjunction with FIG. 2, electrical conductivity is provided by a separate layer of electrically conductive material.

As illustrated in FIG. 1B, second side 103 includes a carrier layer 104 having a thin film antenna array 111 disposed thereon. The thin film antenna array 111 includes a number of antenna elements 110-*i*. Each such antenna element 110-*i* is capable of transmitting and/or receiving signals. To process the signals transmitted from or received by thin film antenna array 111, signal processing electronics are required. In the illustrative embodiment, signal processing electronics 112-*i* is associated with each antenna element 110-*i* and supported on carrier layer 104. In other embodiments the signal processing electronics may be placed in a different location.

Figure 3:
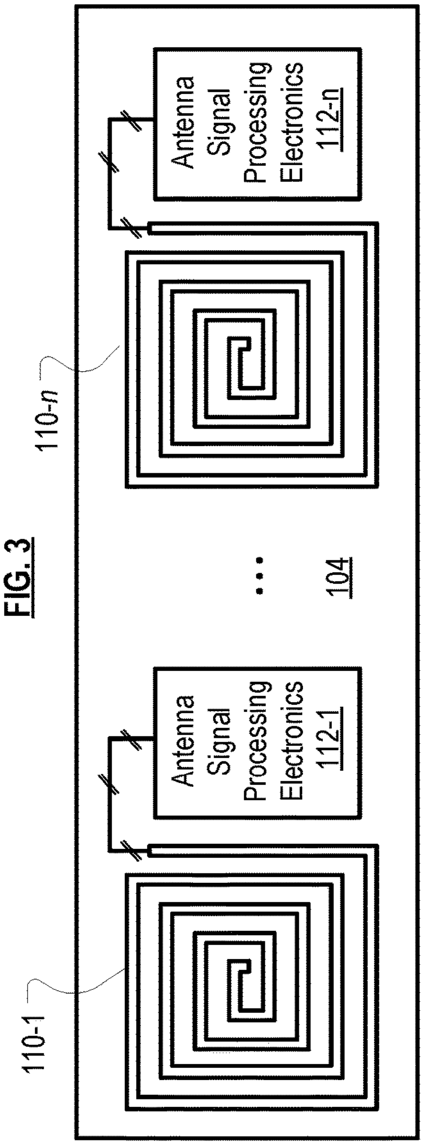
FIG. 3 illustrates an embodiment of thin film antenna elements on the second surface of the structural element.

In one embodiment, the antenna elements 110-*i* can be implemented as a very thin, flat "patch" of an electrically conductive material comprising an electrode that, in the illustrative embodiment, is formed on the carrier layer 104. As described in further detail below in conjunction with FIG. 3, in some embodiments, the electrodes of each antenna element 110-*i* can be printed on the carrier layer 104 using an electrically conductive ink. Printed elements are advantageous for a number of reasons. In some other embodiments, the electrodes of each of each antenna element 110-*i* may be stamped on carrier layer 104, and could be located on either side of the carrier layer 104. In either embodiment, because carrier layer 104 is a flexible material, either approach results in a flexible thin film antenna array 111 on the second side 103 of the structural element 100.

In some embodiments, the thin film antenna array 111 may have a thickness of between about 1 and 250 microns. The thin film antenna elements 110-*i* are flexible and can be bent or rolled without deformation that impacts the ability to operate within antenna parameters they are designed for upon being deployed (e.g., from a folded or rolled configuration). For instance, in one implementation, the antenna elements can have a flexural modulus of between about 35 and about 60 megapascals when fabricated with appropriate dimensions. As such, the thin film antenna elements are highly deformable during storage without impacting desired performance characteristics once they are deployed. The electrodes can be made from a wide variety of electrically conductive materials that are also flexible and are capable of achieving the required performance characteristics in a given implementation. Two non-limiting examples of electrically conductive materials that the electrodes can be made of can include aluminum and silver, but it should be appreciated that other conductive materials, or combinations thereof, can be used. The shape of the electrodes can vary depending on the implementation, as discussed below in conjunction with FIG. 3.

In some embodiments, carrier layer 104 comprises an ultra-thin, ultralightweight, and flexible substrate material, such as any of a variety of plastics (e.g., polyethylene, polypropylene, polyethylene terephthalate, acrylonitrile-butadiene-styrene, polyamides, etc.). In some embodiments, the carrier layer 104 is Mylar® brand stretched polyethylene terephthalate (PTE) film, available from Dupont Teijin Films US and others. In one non-limiting embodiment, carrier layer 104 has a thickness in a range of about 1 to about 250 microns.

In the illustrative embodiment depicted in FIGS. 1A and 1B, the support substrate 102 and carrier layer 104 are simply the two major surfaces of a single continuous sheet wrapped around (or otherwise seemed and appropriately sealed) to form a gas-tight seal and enclose an inflatable volume. Once inflated, structural element 100 attains the state depicted in FIGS. 1A and 1B. The volume can be inflated the methods described later in this specification in conjunction with the embodiments described in FIGS. 6-8.

In some embodiments, the structural element 100 can include one or more inflatable elements for deploying the structural element 100. Upon inflation, the inflatable elements cause the support substrate 102 to be spaced apart from carrier layer 104 by a specific separation distance, attaining the state depicted in FIGS. 1A and 1B. For instance, in some embodiments, one or more of such inflatable elements create a requisite separation distance between the electrically conductive support substrate 102 and the antenna elements 110-*i* so that it functions as a ground plane to enable antenna array 111 to operate in accordance with intended radiation parameters including one or more of radiation pattern, front to back ratio, antenna polarization, directivity, antenna gain, antenna correction factor, etc.

The structural element 100 can include support elements, also referred to as "supports" herein, that enhance structural integrity of the structural element 100. In one non-limiting embodiment, supports 106A and 106B are inflatable elements. In one embodiment, these inflatable elements can be "tubes" of material, such as the same material as support substrate 102 and/or carrier layer 104. In such embodiments, support substrate 102 and carrier layer 104 might not define an enclosed volume. As such, in these embodiments, for some of the space-faring embodiments (e.g., incorporation into a satellite, etc.) of structural element 100, when the structural element is deployed such that the support substrate 102 and carrier layer 104 are spaced apart, there is nothing but the vacuum of space between these layers (except to any minimal extent that portions of support tubes may extend into the region between the layers). In other words, there is neither solid material nor liquid material between these layers. And to the extent there is any gas present, it is no more than is experienced by a space vehicle orbiting at Low Earth Orbit. That is, the pressure is in the range of about $10^{-4}$ to about $10^{-8}$ Pascals, as a function of orbital height within LEO (approx. 300 to 2000 km above the surface of the Earth).

In some embodiments, a UV-curable resin is applied to supports 106A and 106B, or to a material disposed on top of the supports, which becomes rigid when exposed to sunlight (such as when structural element 100 is deployed in space as part of a satellite). In some other embodiments, supports 106A and 106B are telescoping arrangements of hollow plastic rods, or some other type of actuatable, lightweight, mechanical linkage as known to those skilled in the art.

Although not illustrated in FIGS. 1A and 1B, it should be noted that in some embodiments, the structural element 100 may also include other features/structures. For example, in some embodiments, cross members (not illustrated), extend between supports 106A and 106B to keep them appropriately spaced apart, so as to keep support substrate 102 and carrier layer 104 taut. In some embodiments, the cross members are inflatable elements, which can be disposed on the outward-facing surface of either support substrate 102 and carrier layer 104. In some embodiments the support elements may retain the two sides at a specific distance and may consist of multiple fibers or standoffs at various placements within the structure.

In some other embodiments, the structural element 100 can also include one or more spacers disposed along a surface of the structural element 100. In one embodiment, the spacers are formed from a curable material that hardens upon exposure to ultraviolet (UV) radiation. Such materials can include UV curable resins, which can be a material in which monomers, oligomers, etc. are solidified through a chain polymerization reaction by ultraviolet rays. The UV curable resin may be applied, for example, as a plurality of spaced-apart, narrow strips (e.g., an inch wide, etc.) on one or both of support substrate 102 and carrier layer 104. Once exposed to sunlight, for example, such regions become rigid and thus provide structural integrity.

As such, structural element 100 can include one or more solar panels 109-*j* that each include plural thin film solar cells 108-*i* supported on a substrate 102, as well as an antenna array 111 comprising plural thin film antenna elements 110-*i* supported on the carrier layer 104. In the illustrative embodiment, support substrate 102 and carrier layer 104 comprise an ultralightweight flexible material. Although not depicted in the figures, when implemented as such ultralightweight flexible materials, support substrate 102 and carrier layer 104 can be folded or rolled prior to deployment, and subsequently unfolded or unrolled during deployment, such as in conjunction with the launch and deployment of a satellite incorporating one or more instances of structural element 100. Due to the use of lightweight thin film materials, a satellite incorporating one or more of the structural elements can have very low mass, and a relatively high surface-area to volume ratio. This can reduce the cost of launching and deploying the satellite.

FIG. 2 illustrates a sectional view of a portion of structural element 100. Support substrate 102 supports thin film solar cells 108-1 to 108-*m*, and carrier layer 104 supports thin film antenna elements 110-1 to 110-*n* and optionally the associated signal-processing electronics 112-*i* to 112-*n*. While FIG. 2 illustrates an embodiment in which solar panels or solar cell elements are disposed on one side of supporting layer 202, in other embodiments, the solar panels or solar cell elements can be disposed on the other side of supporting layer 202. In some embodiments, a ground plane is provided for antenna elements 110-*i*.

In this one embodiment that is illustrated, the ground plane is implemented by via a thin, electrically conductive layer 202. In some embodiments, layer 202 is a foil of an electrically conductive material, such as aluminum or copper, typically having a thickness in a range of about 25 to about 130 microns. The foil can be printed (using low-cost screen printing) or could be adhered (e.g., vacuum deposited or laminated) to the "underside" (i.e., the side of support substrate 102 that faces carrier layer 104 of support substrate 102). In some other embodiments, the electrically conductive foil is used without support substrate 102. Although depicted in FIG. 2 as being spaced apart from support substrate 102 for pedagogical purposes, layer 202 abuts support substrate 102. Hereinafter, reference to "support substrate 102" is understood to include embodiments in which support substrate 102 includes layer 202, unless otherwise indicated.

As illustrated in FIG. 2, support substrate 102 and carrier layer 104 are separated by gap G. As previously noted, for antenna array 111 to operate as desired (e.g., in accordance with desired characteristics or at a desired operating frequency), the electrodes of the antenna elements 110-1 to **110-*n* should be separated from the ground plane (i.e., support substrate 102) by a specific separation distance. As such, gap G between support substrate 102 and carrier layer 104 should be set so that the support substrate 102 and the electrodes of the antenna elements 110-1 to 110-*n*** are separated by the specific separation distance needed for the antenna to operate as desired. Providing an additional layer of conductive material (e.g., a metallic RF reflective coating) that serves as a ground plane can result in higher efficiency. In some low frequency implementations (e.g., below 1 gigahertz) of a thin, light weight structural element, the ground plane and another plane that includes the electrode of the antenna should be separated by a distance, or gap, to achieve desired operational characteristics and improve efficiency of the antenna elements and the structures which are described herein maintain that distance between the ground planes and the elements.

In some embodiments, prior to deployment of structural element 100, support substrate 102 and carrier layer 104 are separated by the specific separation distance. However, in some other embodiments, at least initially or prior to deployment of structural element 100, the support substrate 102 and carrier layer 104 may not be separated by this specific separation distance. For example, as previously discussed, prior to deployment, they may be in a folded or rolled state. As previously noted, inflation of the volume created by unitary thin film defining support substrate 102 and carrier layer 104, or inflatable elements, such as supports 106A and 106B, can be used to create the specified separation distance. Additionally, in some embodiments, inflation of the supports facilitates deployment of structural element 100.

Antenna elements **110-*i* and the electrodes of those antenna elements can have any one of variety of shapes (e.g., spiral, rectangular, square, circular, include cut outs, etc.) and sizes. As non-limiting examples, the electrode may have a spiral shape (e.g., a circular or rectangular spiral), a spherical shape, a flat planar shape, etc. The antennas that make up the array can be patch antennas that have any of these shapes, and can thus be characterized as one or more of a spiral antenna, a spherical antenna, a patch antenna, etc. depending on the implementation. In the embodiment illustrated in FIG. 3, antenna elements 110-1 to 110-*n* are in the form of a rectangular spiral patch, but alternative configurations, such as circular, etc., can be utilized depending on the implementation. In other implementations not shown in FIG. 3**, the antenna can have a spherical structure. Both the shape and size affect various antenna characteristics, such as the antenna's resonate frequency, polarization, radiation pattern, and impedance. In some other embodiments, the elements have a 3D shape, with material placed in different Z-dimension locations, as compared to the aforementioned flat patch element, which typically has a single thickness of material and such element may also fold, compress or otherwise offer flexibility between a flat stowed position and its position for use. It is within the capabilities of those skilled in the art of antenna design to calculate the size and shape of an antenna element for any particular frequency and/or gain requirement.

In the illustrative embodiment, antenna elements **110-*i* can be printed on carrier layer 104 utilizing any known methods. For example, in some embodiments, antenna elements 110-*i* can be formed using an electrically conductive ink that is printed or stamped onto carrier layer 104. In some embodiments, the electrically conductive ink can include a polymer thick film (PTF) containing electrically conductive material, such as silver flakes or graphite. Any formulation that provides an electrically conductive ink, as known to those skilled in the art, may suitably be used. The thickness of such printed antenna elements 110-*i* is typically in a range of about 1 to about 250 microns. In some other embodiments, a very thin piece (e.g., about 1 to about 250 microns) of electrically conductive material such as aluminum, copper, silver, etc., can be fabricated (e.g., cut into pieces using a die cutter, laser cutter, etc.) to have a desired shape and size, and can then be adhered or otherwise attached to carrier layer 104**.

As previously noted, antenna elements **110-*i* must be either directly or indirectly electrically coupled to signal-processing electronics, as is known in the art. In the illustrative embodiment depicted in FIGS. 2 and 3, each antenna element 110-*i* is electrically coupled to an instance of signal processing electronics 112-*i*. In the illustrative embodiment, signal-processing electronics 112-*i* are disposed on carrier layer 104. (Although illustrated as being spaced apart from carrier layer 104 for clarity, the various instances of signal-processing electronics 112-*i* are disposed on the surface of carrier layer 104**.)

Figure 4:
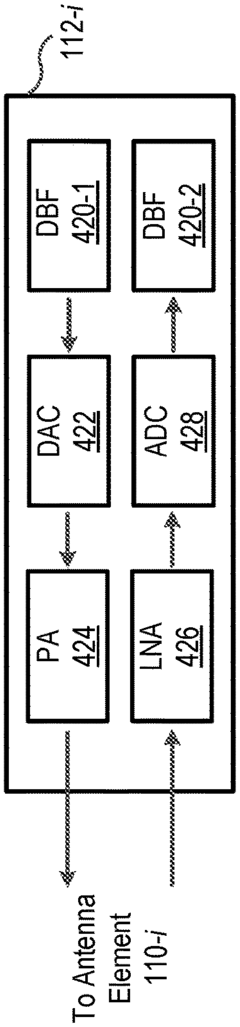
FIG. 4 illustrates an embodiment of antenna signal-processing electronics for use with the thin film antenna elements.

In the illustrative embodiment, signal-processing electronics **112-*i* may include radio frequency front end (RFFE) circuitry for amplifying an RF signal radiated from each antenna element 110-*i*, and for amplifying an RF signal that is received by each antenna element 110-*i*. In other embodiments multiple antenna elements may be grouped together to create a sub-array and such sub-arrays would be connected as noted to the signal processing electronics. It is desirable for this circuitry to be as close to antenna elements 110-*i* as is practical. In the illustrative embodiment, and as illustrated in FIG. 4, the transmit circuitry may include digital beam former 420-1, digital-to-analog converter 422, and power amplifier 424. The receive circuitry includes low-noise amplifier 426, analog-to-digital converter 428, and digital beam former 420-2. It is within the capabilities of those skilled in the art to design, build, and operate signal processing electronics 112-*i***.

In some embodiments, multiple antenna elements **110-*i*, which are connected to multiple instances of signal-processing electronics 112-*i***, are coupled to one another to provide a phased-array antenna.

The greater the number of antenna elements **110-*i***, the larger the physical size of the antenna and the more directivity and/or gain the antenna will have. Directivity is an important end-state metric used to describe the focusing power of an antenna, and higher gains are often highly desirable. Thus, a goal for many applications is to have an array with as many antenna elements as possible to create the highest directivity.

In some embodiments, signal processing electronics **112-*i*** may also include (i) a modem and (ii) other circuitry to modulate or demodulate a signal into a signal that may be stored on memory, connected to a computer for data transfer, or any other use.

Each antenna element **110-*i* may include feed system, which electrically couples it to signal processing electronics 112-*i*. The feed system can be, for example and without limitation, a microstrip line, coaxial probe, aperture coupled feed, or proximity coupled feed, and it is within the capabilities of those skilled in the art to design a feed system for embodiments of the invention. In some embodiments, the feed line comprises electrically conductive ink or foil. In some embodiments this feed system may be coupled with one or more of the support structures to maintain the distance between the element 110-*i* and 102**.

Because the structural element 100 is flexible and highly compactable, it can rolled or folded in multiple directions and multiple times as a function of the overall size of support substrate 102 and carrier layer 104. For example, in some embodiments, structural element 100 can be compacted to a thickness of less than 0.25 inches, in a "stow" state. Because of its construction, structural element 100 has negligible mass in addition to stowing to a very small size. Yet, in fully deployed mode, antenna array 111 incorporated therein will exhibit very high directivity and gain.

Figure 5:
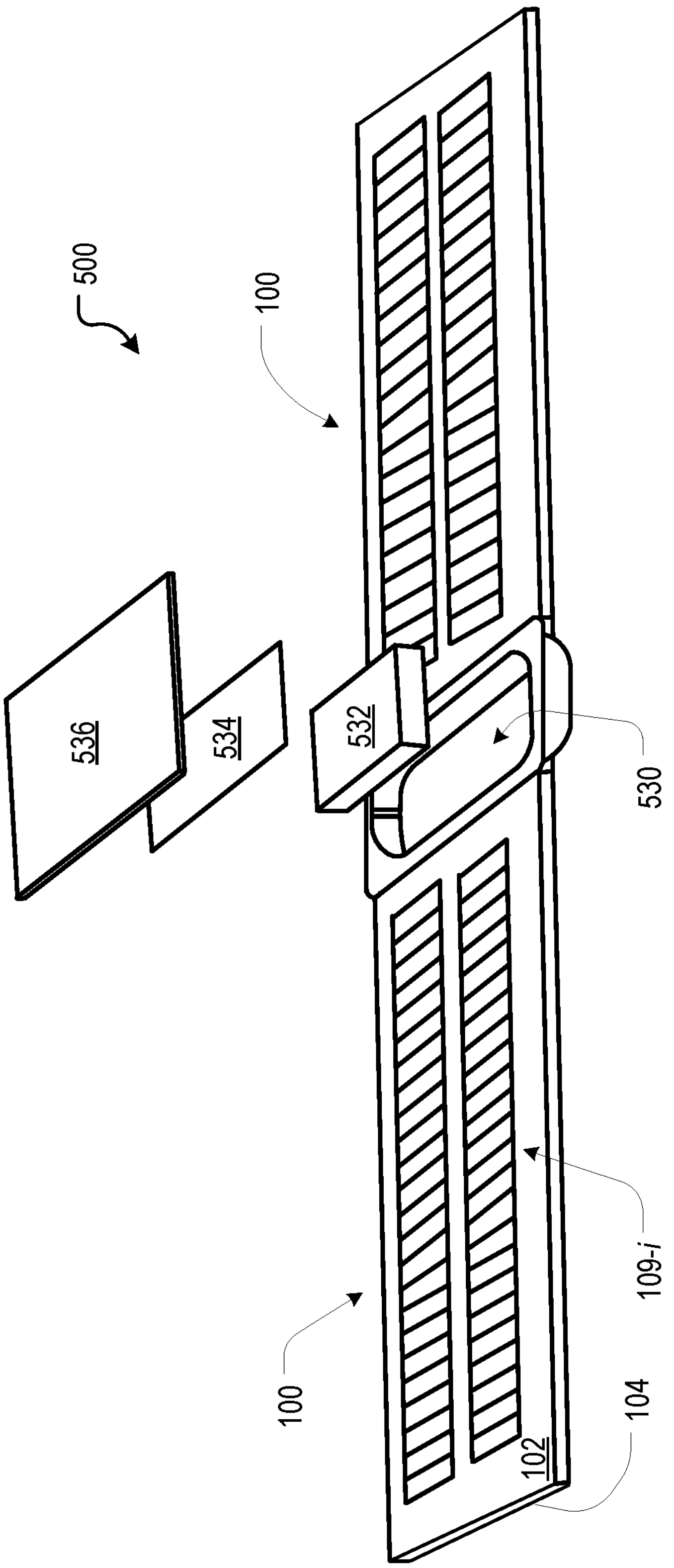
FIG. 5 illustrates a satellite incorporating the structural element of FIG. 1A/1B.

As previously noted, structural element 100 may form part of a satellite, such as satellite 500 illustrated in FIG. 5. In this embodiment, satellite 500 includes two instances of structural element 100. In other embodiments, a satellite may include one, or more than two instances of structural element 100. In other embodiments the satellite elements for control, management and power storage may be placed in other locations, including integrated circuits which are low temperature soldered to 102 and or 104. For instance, wiring for things such as an air coil can be included in the thin film.

Satellite 500 further includes pouch 530, which is centrally located between structural elements 100. Pouch 530 receives battery 532, and processor(s) and associated electronics 534. The processor may include software for managing various satellite functions, including, without limitation, management of the solar panels 109 and battery 532, control functions related to deployment of structural elements 100, and telecommunications management. Cover 536 serves as a carrying board for processor/electronics 534 and battery 532. Additionally, cover 536 is usable for attaching satellite 500 to a dispenser, etc., during launch. In some embodiments thin film batteries may be embedded into, or included on either flexible structures 102 or 104.

When in space, such as in low Earth orbit, structural element 100 is normally oriented so that the antenna array (not illustrated in FIG. 5) is Earth-facing, and solar panels 109-*i* are space-facing. In some embodiments, satellite 500 includes plural attitude control system components (not illustrated) that are placed along structural elements 100 in order to alter/maintain the satellite's attitude. In some embodiments, the attitude control systems are magnetically actuated in conjunction with the magnetosphere.

In some embodiments, support substrate 102 and carrier layer 104 are treated to alter albedo (i.e., reflectivity) at select regions. With such regions of relatively lower and relatively higher albedo, the temperature of the satellite can be controlled by altering the attitude of satellite 500 (via the aforementioned attitude control systems). More particularly, if the temperature of the satellite drops based below a desire temperature based on the attitude of the satellite and its resulting orientation with respect to the sun, the satellite's attitude is then altered to increase the exposure of relatively lower albedo regions of the wing to the sun. This will cause the satellite to absorb more energy, such that the desired temperature is maintained. Conversely, if the temperature of the satellite increases due to the attitude of the satellite and its resulting orientation with respect to the sun, the satellite's attitude is altered to increase the exposure of the relatively higher albedo regions of the wing to the sun. This will cause the satellite to reflect more energy, such that the desired temperature is maintained.

Figure 6:
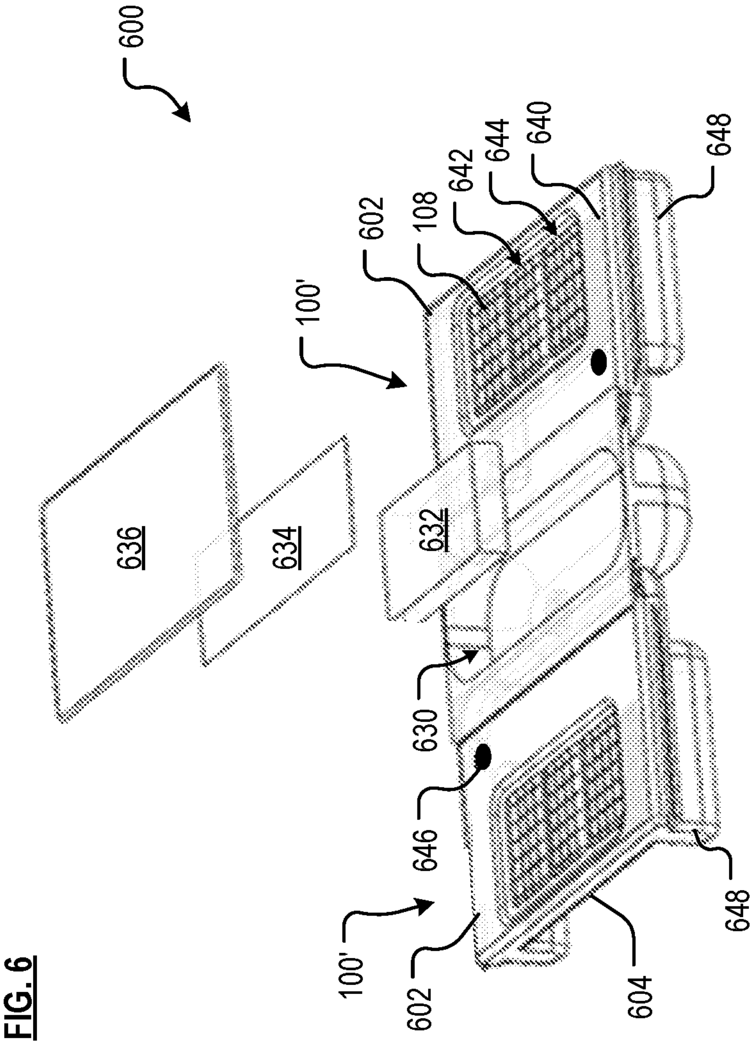
FIG. 6 illustrates a satellite incorporating an alternative embodiment of the structural element illustrated in FIGS. 1A/1B, wherein the satellite is illustrated in a partially deployed state.
Figure 7:
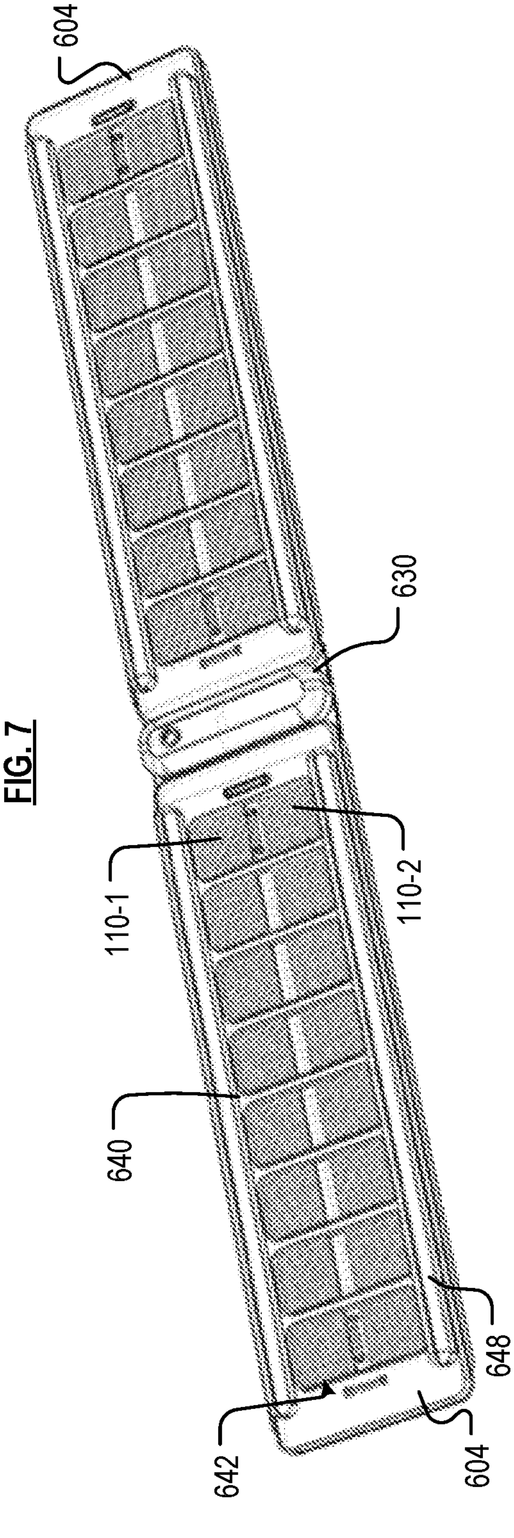
FIG. 7 illustrates the satellite of FIG. 6 in a fully deployed state.
Figure 8:
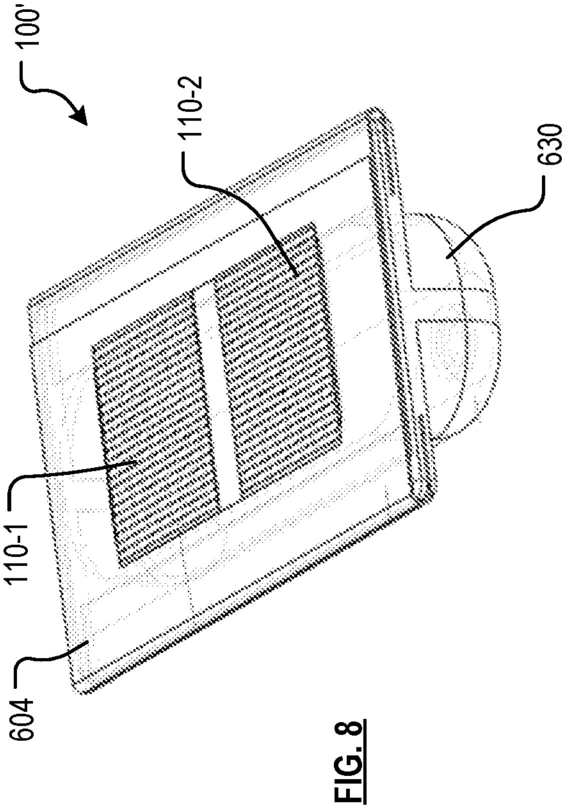
FIG. 8 illustrates the satellite of FIG. 6 in a stowed state, such as for launch.

FIGS. 6-8 illustrate satellite 600, which may include an alternative embodiment of structural elements 100 illustrated in FIGS. 1A and 1B. FIG. 6 illustrates satellite 600 in a partially deployed state, showing surface 602 (which receives solar cells) of a portion of the two instances of structural elements 100'. FIG. 7 illustrates satellite 600 in a fully deployed state and shows the Earth-facing surface 604 of structural elements 100'. In this embodiment, both surface 602 and surface 604 (which receives antenna elements) are characterized by inflated regions 640 and uninflatable or uninflated regions 642 (hereinafter collectively referenced as "uninflatable regions 642"). These inflated and uninflatable regions collectively define a plurality of payload-receiving regions 644 on both surfaces 602 and 604 of each incidence of structural element 100'. The surfaces 602 and 604 can be made from the same materials as support substrate 102 and carrier layer 104.

Referring to FIG. 6, payload-receiving regions 644 on surface 602 receive solar panels 109-*i*. Referring to FIG. 7, payload-receiving regions 644 receive antenna elements 110-*i*, such as antenna elements 110-1 and 110-2. In some other embodiments, payload-receiving regions 644 are present only on one side of structural element 100', such as surface 602, and receive antenna elements 110-*i*. In the illustrative embodiment, structural elements 100' includes stiffener ribs 648. In some other embodiments, other physical adaptations are used, as will occur to those skilled in the art in light of specification, to stiffen structural elements 100'.

In the illustrative embodiment, satellite 600 includes two igniters 646. The igniters ignite one or more propellants to generate a gas for inflating the appropriate portions of satellite 600. If plural propellants are used, the propellants can be ignited in series, or in parallel. As a function of size, or construction, more than two igniters 646 can be used. For example, in some embodiments, one or more igniters are used to inflate stiffener ribs 648. Ignition materials for igniters 648 include nitroguanidine, phase-stabilized ammonium nitrate, or other nonmetallic oxidizers, and a nitrogen-rich fuel.

In some other embodiments, a small pressure vessel that is mounted to the satellite is filled with a fluid at sea-level pressure, and releases fluid to maintain the satellite at a certain pressure. A relief valve can be fluidically coupled to the inflatable regions of satellite 600 to release fluid to address over-pressure situations, as may occur in higher heat environments. In such embodiments, the life of the satellite would be limited to the amount of fluid stored on the satellite.

In some additional embodiments, a pair of one-way valves is mounted in a pressure vessel that is located either internal or external to satellite 600. In some embodiments, the pressure vessel has a small compressor motor for compressing the fluid from the satellite (and through one of the one-way valves) into the pressure vessel. This would occur only in extreme heat, and when the pressure in the satellite is above the nominal operation pressure. When the satellite is in a cold environment, the one-way valve controlling flow into the inflatable regions of the satellite releases fluid to increase the satellite's pressure to the nominal operating pressure.

In yet some further embodiments, a method that avoids the use of valves, pressure vessels, and external components is used. Because the pressure on the ground is approximately 100,000 Pa, while the pressure in space the pressure is approximately $1.322\times10^{-11}$ Pa, gas inside the inflatable satellite will naturally expand with altitude. Prior to launch, the satellite is fully deflated and packed in such a way as to prevent expansion. A precise amount of fluid is injected into the inflatable satellite. The fluid, which could be air, nitrogen or other fluid, will then increase the pressure within the satellites as they move to lower (ambient) pressure environments. In some embodiments, one or more one-way release valves can be incorporated to prevent over inflation.

It is of course important to carefully measure the fluid in satellite 600 so that the expansion of the fluid maintains the correct amount of pressure inside the satellite to maintain appropriate rigidity, while avoiding overpressure that might cause it to explode or leak gas. As satellite 600 moves through various altitudes, the external pressure will vary, and, additionally, changes in the temperature of the satellite will have a dramatic impact on the satellite's internal pressure. As such, material selection for the satellite, and the design of seams are important considerations, both of which are within the capabilities of those skilled in art.

In the illustrative embodiment, satellite 600 includes pouch 630, centrally located between structural elements 100', which receives battery 632 and processor(s) and associated electronics 634. The processor may include software for managing various satellite functions, including, without limitation, management of the solar panels 109-*i* and battery 632, control of inflation, and telecommunications management. Cover 636 serves as a carrying board for processor/electronics 634 and battery 632. Additionally, cover 636 is usable for attaching satellite 600 to a dispenser or other object during launch. The pouch can be inflatable, or non-inflatable (or inflatable but remain uninflated).

In some embodiments, satellite 600 includes plural attitude control systems (not illustrated) that are placed along structural elements 100' in order to alter/maintain the satellite's attitude. In some embodiments, the attitude control systems are magnetically actuated in conjunction with the magnetosphere.

FIG. 8 illustrates satellite 600 in an uninflated, and folded state, such as for launch, showing a portion of surface 604 and antenna elements 110-1 and 110-2.

Summarizing, the apparatus comprising the structural element, as depicted and described, includes: (i) a first side comprising a thin-film antenna, and (ii) a second side comprising a thin-film solar panel. Embodiments of the apparatus comprising the structural element may further comprise one or more of the following features, in any (non-conflicting) combination, among other features disclosed herein:

- The first side comprises a carrier layer, upon which the thin-film antenna is disposed.
- The thin-film antenna comprises a plurality of thin-film antenna elements.
- The thin-film antenna elements are organized and operated as a phased-array antenna.
- The thin-film antenna elements comprise one or more electrodes.
- The electrodes are disposed on the carrier layer.
- The electrodes are printed or stamped on the carrier layer.
- The electrodes are printed using an electrically conductive ink.
- The shape and size of the electrodes affect antenna characteristics, such as any one or more of: resonate frequency, polarization, radiation pattern, and impedance.
- The electrodes have any one of a variety of shapes, such as rectangular, square, circular, including cut-out regions, and spiral versions of such shapes.
- The electrodes are configured as a square spiral or a circular spiral.
- The electrodes have a flat-planar form.
- The electrodes have a 3D shape, with some material in different Z-dimension locations.

- The electrically conductive ink comprises a polymer thick film (PTF) containing electrically conductive material.
- The thin-film antenna elements have a thickness in the range of about 20 to about 250 micrometers.
- The thin-film antenna elements are electrically coupled to signal processing electronics.
- An instance of signal processing electronics is electrically coupled to each thin-film antenna element.
- Each instance of the signal processing electronics is embodied as a thin film that is disposed on the carrier layer proximal to an associated thin-film antenna element.
- The carrier layer has a thickness in the range of about 50 to about 200 micrometers.
- The carrier layer is selected from at least one of the following materials: polyethylene, polypropylene, polyethylene terephthalate, acrylonitrile-butadiene-styrene, polyamides, etc.).
- The carrier layer is Mylar® brand stretched polyethylene terephthalate film.
- The second side comprises a support substrate, upon which the thin-film solar panel is disposed.
- The thin-film solar panel comprises a plurality of thin-film solar-cells.
- The support substrate is electrically conductive.
- The support substrate is inherently electrically conductive by virtue of its chemical composition, or by being doped or otherwise treated with electrically conductive materials.
- The support substrate is DuraLar™ brand metallized film.
- The support substrate is rendered electrically conductive via by abutting an electrically conductive layer thereto.
- The electrically conductive layer is a foil of an electrically conductive material.
- The foil is aluminum or copper.
- The foil has a thickness in the range of about 25 to about 130 micrometers.
- The foil abutted to the support substrate via deposition, printing, vacuum deposited, or adhering.
- The electrically conductive foil is used in place of the support substrate.
- The support substrate and the carrier layer are implemented as a single material that is formed to create an inflatable closed volume, wherein inflation separates one major surface—serving as the support substrate—from the other major surface—serving as the carrier layer.
- A curable material is applied to one or more regions of support substrate and/or carrier layer and/or other otherwise flexible support, which curable material hardens upon exposure to ultraviolet radiation (UV), such as provided by sunlight. This stiffens the structural element when deployed.
- The support substrate and the carrier layer are separated, when the structural element is deployed, by inflating the inflatable closed volume.
- The structural element include supports that are configured to support the support substrate and carrier layer.
- In use, the first side having the thin-film antenna and the second side having the thin-film solar panels are separated from one another by a specific separation distance.
- The specific separation distance is dependent on desired operating characteristics of the thin-film antenna.
- The carrier layer and the support substrate are taut when the structural element is deployed for use.

The carrier layer and the support substrate are folded or rolled when in a stowed state.

Inflating the inflatable closed volume deploys the structural element.

The apparatus is a satellite.

The satellite includes one or more of the structural elements.

The satellite includes a battery, processors, and associated electronics.

The battery is a flexible battery.

The processor includes software for managing satellite functions.

The satellite includes attitude control systems to maintain or alter the satellite's attitude.

The attitude control systems are magnetically actuated in conjunction with the Earth's magnetosphere.

When is space, and when structural element(s) are deployed, the thin-film antenna is Earth-facing for communications, and the thin-film solar panel(s) are space-facing.

The support substrate and carrier layer are treated to alter albedo (i.e., reflectivity) at select regions.

The outward-facing surface, when deployed, of carrier layer includes inflatable portions and uninflatable portions that collectively define a plurality of payload receiving regions, at least some of which payload-receiving regions one or more of the thin-film antenna elements.

The spacing between the payload-receiving regions, which sets the spacing between one or more groups of the thin-film antenna elements, thereby affects the operating characteristic of the thin-film antenna.

The outward-facing surface, when deployed, of support substrate includes inflatable portions and uninflatable portions that collectively define a plurality of payload receiving regions, at least some of which payload-receiving regions one or more of the thin-film solar cells.

It is to be understood that the disclosure describes a few embodiments and that many variations of the invention can easily be devised by those skilled in the art after reading this disclosure and that the scope of the disclosed embodiments is to be determined by the following claims.

What is claimed is:

1. An apparatus, comprising:

a structural element having a first side and a second side opposite the first side, wherein the first side comprises:
- a carrier layer;
- an electrode, formed on the carrier layer, wherein the electrode functions as an antenna element; and wherein the second side comprises:
- a solar panel; and
- a support substrate that is configured to support the solar panel, wherein the support substrate is separable from the electrode by a specific separation distance and serves as a ground plane for the antenna element.

2. The apparatus of claim 1, wherein the solar panel and the electrode are flexible, and wherein the structural element is in a folded or rolled configuration prior to deployment.

3. The apparatus of claim 1, wherein the structural element further comprises:

one or more inflatable elements for deploying the structural element upon inflation, wherein the one or more inflatable elements cause the support substrate to be spaced apart from the electrode by the specific separation distance upon being inflated.

4. The apparatus of claim 1, wherein the electrode is printed on the carrier layer.

5. The apparatus of claim 1, wherein the electrode is a conductive spiral.

6. The apparatus of claim 1, wherein the support substrate comprises:

a supporting layer, wherein the solar panel overlies one surface of the supporting layer; and a thin conductive layer that overlies another surface of the supporting layer, wherein the thin conductive layer serves as the ground plane of the antenna element.

7. The apparatus of claim 6, wherein the thin conductive layer comprises: a metalized layer, and wherein the supporting layer and the carrier layer each comprise one or more of: polyethylene terephthalate (PET) film, a nylon film, a mylar film, a polyamide film, and a polyimide film.

8. The apparatus of claim 1, wherein the structural element comprises:

one or more structural members disposed along a surface of the structural element, wherein the one or more structural members comprise: a curable material that hardens upon being exposed to ultraviolet radiation to cause the one or more structural members to become rigid.

9. The apparatus of claim 1, wherein the apparatus is a spacecraft, and wherein the structural element is a wing of the spacecraft.

10. The apparatus of claim 1, wherein the antenna element is a thin film antenna element, and wherein the first side further comprises: a plurality of additional electrodes, formed on the carrier layer, wherein each of the plurality of additional electrodes function an additional thin film antenna element, and wherein the thin film antenna element and the additional thin film antenna elements are configured as a phased antenna array.

11. An apparatus, comprising:

a structural element comprising:
- a first side comprising a thin film antenna; and
- a second side opposite the first side, wherein the second side comprises: a thin film solar panel; and
- a support substrate that is configured to support the thin film solar panel, wherein the support substrate is separable from the thin film antenna by a specific separation distance and serves as a ground plane for the thin film antenna.

12. The apparatus of claim 11, wherein the first side comprises a plurality of thin film antennas configured as a phased antenna array.

13. The apparatus of claim 11, wherein the first side is spaced apart from the second side by one or more support members.

14. The apparatus of claim 13, wherein the thin film solar panel and the thin film antenna are flexible, wherein the structural element is in a folded or rolled configuration prior to deployment, and wherein the one or more support members comprise:

one or more inflatable elements for deploying the structural element upon inflation.

15. The apparatus of claim 11, wherein the thin film antenna comprises:

an electrode printed on a carrier layer, wherein the electrode functions as an antenna element.

16. The apparatus of claim 11, wherein the second side comprises a plurality of thin film solar panels, wherein each thin film solar panel comprises a plurality of thin film solar cells.

17. An apparatus, comprising:

a structural element that is in a folded or rolled configuration prior to deployment, the structural element comprising:

a first side comprising a thin film antenna;

a second side opposite the first side, wherein the second side comprises: a thin film solar panel; and a support substrate that is configured to support the thin film solar panel, wherein the support substrate is separable from the thin film antenna by a specific separation distance and serves as a ground plane for the thin film antenna.

18. The apparatus of claim 17, wherein the thin film antenna and the thin film solar panel are flexible.

19. A satellite, comprising:

a wing having a first thin film structure and a second thin film structure opposite the first thin film structure, wherein the first thin film structure comprises:

a carrier layer;

an electrode, formed on the carrier layer, wherein the electrode functions as an antenna element; and wherein the second thin film structure comprises:

a solar panel; and a support substrate that is configured to support the solar panel, wherein the support substrate is separable from the electrode by a specific separation distance and serves as a ground plane for the antenna element, wherein the support substrate comprises:

a supporting layer, wherein the solar panel overlies one surface of the supporting layer; and a thin conductive layer that overlies another surface of the supporting layer, wherein the thin conductive layer serves as the ground plane of the antenna element.

20. The satellite of claim 19, wherein the solar panel and the electrode are flexible, and wherein the wing is in a folded or rolled configuration prior to deployment.

21. The satellite of claim 19, wherein the wing further comprises:

one or more inflatable elements for deploying the wing upon inflation, wherein the one or more inflatable elements cause the support substrate to be spaced apart from the electrode by the specific separation distance upon being inflated.

22. The satellite of claim 19, wherein the electrode is printed on the carrier layer.

23. The satellite of claim 19, wherein the electrode is a conductive spiral.

24. A satellite, comprising:

a structural element having a first side and a second side opposite the first side, wherein the first side comprises:

a carrier layer;

a plurality of electrodes, formed on the carrier layer, wherein each electrode functions as an antenna element, and wherein the antenna elements are configured as a phased antenna array; and wherein the second side comprises:

a solar panel; and a support substrate that is configured to support the solar panel, wherein the support substrate is separable from the electrodes and serves as a ground plane for the antenna elements.

25. The satellite of claim 24, wherein the electrodes are printed on the carrier layer.

26. The satellite of claim 24, wherein each electrode has a spiral shape and is a conductive spiral.

27. The satellite of claim 24, wherein the plurality of electrodes are each formed from a thin film of conductive material, and wherein the antenna elements are thin film antenna elements.

28. The satellite of claim 24, wherein the plurality of electrodes are each printed on the carrier layer using a thin film of conductive material, and wherein the antenna elements are thin film antenna elements.

29. A satellite, comprising:

a structural element having a first side and a second side opposite the first side, wherein the first side comprises:

a carrier layer;

a phased antenna array, comprising: a plurality of electrodes, formed on the carrier layer, wherein each electrode functions as an antenna element of the phased antenna array; and wherein the second side comprises:

a solar panel; and a support substrate that is configured to support the solar panel, wherein the support substrate is separable from the electrodes and serves as a ground plane for the antenna elements.

30. The satellite of claim 29, wherein the electrodes are printed on the carrier layer.

31. The satellite of claim 29, wherein the plurality of electrodes are each formed from a thin film of conductive material, and wherein the antenna elements are thin film antenna elements.

32. The satellite of claim 29, wherein the plurality of electrodes are each printed on the carrier layer using a thin film of conductive material, and wherein the antenna elements are thin film antenna elements.

33. The satellite of claim 32, wherein each electrode has a spiral shape and is a conductive spiral.

* * * * *